United States Patent [19]
Robinson et al.

[11] Patent Number: 5,958,472
[45] Date of Patent: Sep. 28, 1999

[54] CRUNCHY CHEWING GUM AND PROCESS FOR MAKING

[75] Inventors: Mary Katherine Robinson, Sparta; Colleen Marie Kramer, Ridgewood; Michael Glass, Fair Lawn, all of N.J.

[73] Assignee: Warner-Lambert Company, Morris Plains, N.J.

[21] Appl. No.: 08/806,969

[22] Filed: Feb. 26, 1997

[51] Int. Cl.⁶ .................................................. A23G 3/30
[52] U.S. Cl. ............................................................ 426/3
[58] Field of Search ............................................. 426/3, 5

[56] References Cited

U.S. PATENT DOCUMENTS

| | | | |
|---|---|---|---|
| 4,382,963 | 5/1983 | Klose et al. | 426/3 |
| 4,514,422 | 4/1985 | Yang et al. | 426/3 |
| 4,579,738 | 4/1986 | Cherukuri et al. | 426/3 |
| 4,744,991 | 5/1988 | Serpelloni | 426/5 |
| 4,792,453 | 12/1988 | Reed et al. | 426/5 |
| 4,961,935 | 10/1990 | Cherukuri et al. | 426/3 |
| 4,971,798 | 11/1990 | Coia et al. | 424/440 |
| 4,980,189 | 12/1990 | Keme et al. | 426/548 |
| 5,063,080 | 11/1991 | Kruger et al. | 426/660 |
| 5,248,508 | 9/1993 | Reed et al. | 426/5 |
| 5,270,061 | 12/1993 | Reed et al. | 426/5 |
| 5,472,733 | 12/1995 | Degady et al. | 426/660 |
| 5,478,593 | 12/1995 | Serpelloni et al. | 426/303 X |
| 5,709,895 | 1/1998 | Tanaka et al. | 426/96 |

FOREIGN PATENT DOCUMENTS

| | | |
|---|---|---|
| 0458750 | 11/1991 | European Pat. Off. . |
| 8038093 | 2/1996 | Japan . |
| 9202149 | 2/1992 | WIPO . |
| 9508926 | 4/1995 | WIPO . |
| 9716078 | 5/1997 | WIPO . |

OTHER PUBLICATIONS

Willibald–Ettle, Ingrid, and Keme, Tomas, Recent Findings Concerning Isomalt in Different Applications, IFI, Nr. 1, 1992, pp. 17–21.

Isomalt—A Sweet Reduced–Calorie Bulking Agent, Food Technology—Jun. 1990, p. 128.

*Primary Examiner*—Arthur L. Corbin
*Attorney, Agent, or Firm*—Linda A. Vag

[57] ABSTRACT

A crunchy chewing gum product having a crunch similar to that provided by incorporating granulated sugar into a sugar-based gum product is prepared by introducing, into the interior of a gum formulation, a granulated isomalt additive.

22 Claims, No Drawings

CRUNCHY CHEWING GUM AND PROCESS FOR MAKING

TECHNICAL FIELD

The present invention pertains to crunchy chewing gum wherein the crunch is provided by a granulated isomalt additive. More particularly, the present invention pertains to sugarless chewing gum exhibiting crunchiness.

BACKGROUND ART

The art of chewing gum manufacture is well established. Suitable gum formulations traditionally contain a substantial quantity of one or more water-insoluble elastomers, either natural, synthetic, or both, flavorants, sweeteners and the like. More recently, sugarless gums containing synthetic, high intensity sweeteners encouraging low calorific content, and/or non-conventional di- and polysaccharides, particularly those which are non-cariogenic, have become increasingly popular. Considerable research has been expended to formulate sugarless gums which retain sugared-based gum properties, such as texture, flavor retention and storage stability, among others.

Sugar-based gums with a crunch have recently become important commercially. Such gums contain crystals of sucrose, or granulated sugar, which provide the needed crunch. The crunch provided by granulated sugar is described as firm and slightly gritty in nature. An acceptable, yet-crunchy substitute, needs to be found for the manufacture of crunchy sugarless gums. In order to be commercially acceptable, it is preferred that the sugarless substitute have a long chew time before the crunchiness has substantially dissipated, and a prolonged storage time. In this regard, crunch-providing gums having internally distributed crunch additives are not similar to gums having a hard outside coating, as the manufacturing and storage problems are quite different. It is also preferred that the crunch provided by the sugarless substitute be similar to that provided by granulated sugar.

Polyols known as sugar alcohols are potential candidates for providing sugarless crunch. Examples are sorbitol, mannitol, maltose, xylitol, and the like. However, in addition to providing crunch, the particular polyol must be storage stable, i.e. the crunchiness must be retained after a commercially acceptable storage time. Further, the flavors and softeners in the gum product should not soften the polyol and thus reduce the crunch, and the process for formation of the additive should be economically feasible.

It would be desirable to provide a sugarless additive which can be utilized to form a chewing gum product having a crunchy feel, in particular, a crunchy feel similar to that provided by granulated sugar, and which maintains this crunchy feel over an extended period of chew time. It would be further desirable to provide a gum having a crunchy feel which maintains this characteristic under commercially desirable storage conditions.

SUMMARY OF THE INVENTION

The present invention concerns a chewing gum comprising: (a) one or more elastomers, sweeteners and flavorants, and (b) an amount of a granulated isomalt additive having a particle size greater than about 50 mesh such that said additive provides a crunch to said gum.

The invention also concerns the crunch additive, and processes for the preparation of the crunch additive and chewing gums containing same.

BRIEF DESCRIPTION OF THE PREFERRED EMBODIMENTS

The present invention pertains to chewing gums containing crystalline isomalt as a crunch-providing additive. Crystalline, granulated isomalt prepared by heating isomalt or an isomalt solution to a temperature above 130° C. followed by cooling and granulation, can be incorporated internally into gum formulations to provide crunch, in particular, a desirable crunch having texture and mouth feel similar to that provided by granulated sugar. The isomalt additive provides for a long lasting crunch and commercially acceptable storage time as compared to other crystalline polyols.

The crystalline isomalt must be employed in a size range which provides for a crunch while chewing. Isomalt crystals having a size greater than 50 mesh (0.300 mm), preferably greater than 40 mesh (0.425 mm), and more preferably in the range of 30 (0.600 mm) to 40 mesh have been found suitable. The gum formulation may be for any type of gum, i.e. chewing gum or bubble gum, and may be provided in any of the traditional gum forms, i.e. sticks, blocks, hard coated pellets, and the like. In accordance with the present invention, the crunch additives are internal, i.e. the crunch is not derived from the coating surrounding hard-coated gum products.

The crunch additive consists substantially of isomalt, optionally containing flavoring agents, coloring agents, and less preferably containing most minor quantities of other polyols. The term "most minor" means less than 20 weight percent based on the weight of the crunch additive. Preferably, no more than 10 weight percent of the crunch additive comprises another polyol, and most preferably, the sole polyol is isomalt. The term "isomalt" as used herein includes these most minor quantity of other polyols unless the clear language indicates otherwise.

The crystalline isomalt is prepared from commercially available isomalt such as, for example, PALATINIT PF from Suddeutsche Zucker. The isomalt is heated to a relatively high temperature prior to being allowed to crystallize. The crystalline isomalt may alternatively be prepared from a solution of isomalt in water. Where solutions of isomalt are used, for ease of processing it is preferred to use concentrated solutions with a 70:30 ratio of isomalt: water being especially preferred. In either instance the isomalt is heated to a temperature above 130° C., preferably above 145° C., and most preferably to about 160° C., or higher. The resultant melt is poured into a pan and allowed to crystallize for a sufficient time at room temperature. A period of 18 hours has been found sufficient. However, shorter or longer times may be used as well. It is preferable to avoid supercooling the melts.

Any granulation method known to those skilled in the art can be used to granulate the material. A preferred method uses granulation equipment such as the "Crack-U-Lizer" model of Modern Process Equipment, Inc. The glassy material is first broken up by any suitable method, to a feed size, preferably in a hopper where it can then be fed to the granulator which has been pre-set for the predetermined particle size distribution. It is also contemplated to crystallize the isomalt by extrusion at relatively high temperature, for example as discussed in U.S. Pat. No. 5,472,733. If extrusion is used, the use of isomalt solutions is less preferable.

Colorants, dyes and/or flavorants may be optionally added to the crunch additive. Flavorants are preferably added to the melted isomalt during the cooling phase preferably at a point where the melt has cooled to a temperature below the flash point of the flavorant. Such determinations are well within the skill of those skilled in the gum arts. Colorants and dyes may also be added with the flavorant or may be mixed with the isomalt prior to heating.

Suitable particle sizes are attained through conventional techniques. The particle size is larger than 50 mesh, preferably larger than 40 mesh, and more preferably in the range of 30–40 mesh. Smaller particle sizes than about 50 mesh will not provide a suitable crunchy feel for any length of time due to their small size, and may suffer from plasticization by water or other gum components during storage. Larger particle sizes are also useful, however. It is understood that the particle sizes herein are those retained by a screen having the cited mesh size, and that the actual particle size will include some particles which are smaller than the particular mesh size. Moreover, an additive of a given average particle size will be expected to have a somewhat smaller average particle size due to some reduction in size during the gum blending operation. Talc and other processing aids such as calcium carbonate may be added when necessary, for example to minimize surface tack.

The gum formulation itself may be varied appropriately to suit the type of gum produced, i.e. chewing or bubble gum. Although the material provided is a sugarless product, one could use the material in a sugar-based gum or in a gum containing both sugars and sugar alcohols as the bulking agents. For a sugarless gum formula, the gum is preferably anhydrous, although the gum formulation need not be anhydrous. Examples of suitable gum formulations may be found in U.S. Pat. Nos. 4,961,935; 4,514,422; 4,382,963; and 4,579,738, which are incorporated herein by reference.

It is preferred to employ in a gum formulation containing the sugarless crunch material, from 5 to 50% of gum base; from 2 to 10% softeners; from 0.5 to 5% flavoring; from 0–2% intense sweeteners; from 0 to 1% colorants; and from 1 to 70% bulking agents, all percentages given in parts by weight.

For sugarless gums the bulking agent is a polyalcohol (polyol). The polyalcohol may comprise any conventional bulking polyalcohol, i.e. sorbitol, mannitol, xylitol, isomalt, erythritol, maltitol, etc., in finely granulated or powdered form. The crunchy chewing gum compositions may be used to provide a variety of chewing gum product formats, such as sticks, slabs, chunks, balls, ropes, tablets, and center filled and confectionery coated gum products.

The amount of crunch additive to be used in the finished chewing gum product depends on several factors including the particle size distribution obtained in preparing the crunch product and the effect desired. In general, less than 9% by weight would be unsuitable in providing sufficient crunch. While amounts greater than 16% would provide crunch in such amount that would only be useful for novelty effects since such amounts are excessive and may overwhelm the desired effect. A preferred range of additive would be from 10–15% by weight of the gum product.

The gum base employed in the present invention can vary depending upon factors such as the type of base desired, the consistency of gum desired and the other components used in the composition to make the final chewing gum product. The gum base may be any water-insoluble gum base known in the art, and includes those gum bases utilized for chewing gums and bubble gums. Illustrative examples of suitable polymers in gum bases include both natural and synthetic elastomers and rubbers. In this regard, polymers which are suitable as gum bases include, without limitation, elastomers of vegetable origin such as chicle, natural rubber, crown gum, nispero, rosidinha, jelutong, perillo, niger gutta, tunu, balata, guttapercha, lechi capsi, sorva, gutta kay, mixtures thereof, and the like. Synthetic elastomers such as butadiene-styrene copolymers, polyisobutylene, isobutylene-isoprene copolymers, polyethylene, mixtures thereof, and the like, are also useful. Suitable gum bases may also include a non-toxic vinyl polymer, such as polyvinyl acetate and its partial hydrolysate, polyvinyl alcohol, and mixtures thereof. When utilized, the molecular weight of the vinyl polymer may range from about 2,000 to about 94,000 Daltons (Da).

The amount of gum base employed will also vary depending upon factors such as the type of base used, the consistency of the gum desired and the other components used in the composition to make the final chewing gum product. In general, the gum base will be present in amounts from about 5% to about 50%, preferably in amounts from about 15% to about 40%, and more preferably in amounts from about 23% to about 35%, by weight of the final chewing gum composition.

The gum base may also include plasticizers or softeners such as lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerine, mixtures thereof, and the like. Waxes, for example, natural and synthetic waxes, hydrogenated vegetable oils, organic waxes such as polyurethane waxes, polyethylene waxes, paraffin waxes, microcrystalline waxes, fatty waxes, sorbitan monostearate, tallow, polypropylene glycol, mixtures thereof, and the like, may also be incorporated into the gum base. Such materials are incorporated into the gum base to provide a variety of desirable textures and consistency properties. Because of the low molecular weight of these ingredients, they are able to penetrate the fundamental structure of the gum base making it plastic and less viscous. These additional materials are generally employed in amounts up to about 18%, preferably in amounts from about 5% to about 18%, and more preferably in amounts from about 10% to about 14%, by weight of the gum base.

In a preferred embodiment, the softening agent is glycerin, such as the commercially available United States Pharmacopeia (USP) grade. Glycerin is a syrupy liquid with a sweet warm taste and has a sweetness of about 60% of cane sugar.

The gum base may also include effective amounts of mineral adjuvants such as calcium carbonate, magnesium carbonate, alumina, aluminum hydroxide, aluminum silicate, talc, tricalcium phosphate, dicalcium phosphate and the like, as well as mixtures thereof. These mineral adjuvants may serve as fillers and textural agents. These fillers or adjuvants may be used in the gum base in various amounts. Preferably, the amount of filler, when used, will be present in an amount up to about 60%, by weight of the chewing gum base.

Effective amounts of a variety of traditional ingredients further may be included in the gum base, such as coloring agents, antioxidants, preservatives, and the like. For example, titanium dioxide and other dyes suitable for food, drug and cosmetic applications, known as F.D. & C. dyes, may be utilized. An anti-oxidant such as butylated hydroxytoluene (BHT), butylated hydroxyanisole (BHA), propyl gallate, and mixtures thereof, may also be included. Other conventional chewing gum additives known to one having ordinary skill in the chewing gum art may also be used in the chewing gum base.

The chewing gum composition containing the base may include effective amounts of conventional additives selected from the group consisting of non-sucrose sweetening agents (sweeteners), plasticizers, softeners, emulsifiers, waxes, fillers, bulking agents (carriers, extenders), mineral adjuvants, flavoring agents (flavors, flavorings), coloring agents (colorants, colorings), antioxidants, acidulants, thickeners, mixtures thereof, and the like. Some of these additives may serve more than one purpose. For example, in sugarless gum compositions, a sweetener, such as sorbitol or other sugar alcohol or mixtures thereof, may also function as a bulking agent.

The plasticizers, softening agents, mineral adjuvants, coloring agents, waxes and antioxidants discussed above, as being suitable for use in the gum base, may also be used in the gum composition. Examples of other conventional additives which may be used include emulsifiers, such as lecithin and glyceryl monostearate, thickeners, used alone or in combination with other softeners, such as methyl cellulose, alginates, carrageenan, xanthan gum, gelatin, carob, tragacanth, locust bean, and carboxy methyl cellulose, acidulants such as malic acid, adipic acid, citric acid, tartaric acid, fumaric acid, and mixtures thereof, and fillers, such as those discussed above under the category of mineral adjuvants. The fillers, when used, may be utilized in an amount up to about 60%, by weight of the gum composition.

The flavoring agents which may be used include those flavors known to the skilled artisan, such as natural and artificial flavors. These flavorings may be chosen from synthetic flavor oils and flavoring aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, and cassia oil. Also, useful flavorings are artificial, natural and synthetic fruit flavors such as vanilla, and citrus oils including lemon, orange, lime, grapefruit, and fruit essences including apple, pear, peach, grape, strawberry, raspberry, cherry, plum, pineapple, apricot and so forth. These flavoring agents may be used in liquid or solid form and may be used individually or in admixture. Commonly used flavors include mints such as peppermint, menthol, artificial vanilla, cinnamon derivatives, and various fruit flavors, whether employed individually or in admixture.

Other useful flavorings include aldehydes and esters such as cinnamyl acetate, cinnamaldehyde, citral diethylacetal, dihydrocarvyl acetate, eugenyl formate, p-methylamisol, and so forth may be used. Generally any flavoring or food additive such as those described in Chemicals Used in Food Processing,, publication 1274, pages 63–258, by the National Academy of Sciences, may be used.

The flavoring agents of the present invention may be used in many distinct physical forms well known in the art to provide an initial burst of flavor and/or a prolonged sensation of flavor. Without being limited thereto, such physical forms include free forms, such as spray dried, powdered, and beaded forms, and encapsulated forms, and mixtures thereof.

The coloring agents useful in the present invention are used in amounts effective to produce the desired color. These coloring agents include pigments which may be incorporated in amounts up to about 6%, by weight of the gum composition. A preferred pigment, titanium dioxide, may be incorporated in amounts up to about 2%, and preferably less than about 1%, by weight of the gum composition. The colorants may also include natural food colors and dyes suitable for food, drug and cosmetic applications. These colorants are known as F.D.&C. dyes and lakes. The materials acceptable for the foregoing uses are preferably water-soluble. A full recitation of all F.D.&C. colorants and their corresponding chemical structures may be found in the Kirk-Othmer Encyclopedia of Chemical Technology, 3rd Edition, in volume 5 at pages 857–885, which text is incorporated herein by reference.

The flavorants, colorants and dyes may likewise be optionally added to the crunch additive as previously described.

The apparatus useful in accordance with the present invention for manufacture of the chewing gum comprises mixing and heating apparatus well known in the chewing gum manufacturing arts, and therefore the selection of the specific apparatus will be apparent to the artisan. In preparing a gum, a composition is made by admixing the gumbase composition with the crunch additive and the other ingredients of the final desired composition. Other ingredients will usually be incorporated into the composition as dictated by the nature of the desired composition as well known by those having ordinary skill in the art. The ultimate chewing gum compositions are readily prepared using methods generally known in the food technology and pharmaceutical arts.

For example, a gum base is heated to a temperature sufficiently high to soften the base without adversely affecting the physical and chemical make up of the base. The optimal temperatures utilized may vary depending upon the composition of the gum base used, but such temperatures are readily determined by those skilled in the art without undue experimentation. The gum base is conventionally melted at temperatures that range from about 60° C. to about 120° C. for a period of time sufficient to render the base molten. For example, the gum base may be heated under those conditions for a period of about thirty minutes just prior to being admixed incrementally with the remaining ingredients of the gum such as plasticizers, softeners, bulking agents, sweeteners, and the crunch additive and/or fillers, coloring agents and flavoring agents to plasticize the blend as well as to modulate the hardness, viscoelasticity and formability of the base. Mixing is continued until a uniform mixture of gum composition is obtained. Thereafter the gum composition mixture may be formed into desirable chewing gum shapes.

Confectionery coated chewing gum compositions incorporating the inventive sugarless crunchy chewing gum compositions are also within the scope of the invention. Such confectionery coated compositions contain the inventive sugarless crunchy chewing gum composition as the center or core portion of the chewing gum product and a confectionery material as a coating over the center portion. The confectionery material may be either a sugar material or a sugarless material, and preferably is a sugarless confectionery material.

The confectionery coated chewing gum compositions may be prepared using standard techniques and equipment known to those skilled in the art. The apparatus useful in accordance with the present invention comprises mixing, heating, coating (dusting) and drying apparatus well known in the chewing gum manufacturing arts, and therefore the selection of the specific apparatus will be apparent to the artisan.

In such a method, a composition is made by admixing the inventive sugarless, substantially anhydrous chewing gum composition as set out above with the other ingredients of the desired core portion composition. The homogeneous mixture is then formed into portions which are then placed in a revolving coating pan. A confectionery coating syrup is prepared, heated if necessary, and then applied to the gum portions. The coated gum portions are then allowed to cool and dry. Various ingredients will usually be incorporated into the confectionery coating composition as dictated by the nature of the desired composition as well known by those having ordinary skill in the art.

Having generally described this invention, a further understanding can be obtained by reference to certain specific examples which are provided herein for purposes of illustration only and are not intended to be limiting unless otherwise specified.

EXAMPLES

EXAMPLE 1

Preparation of Isomalt Granulates

1a. An isomalt granulate was prepared by heating a 70:30 isomalt/water mixture to 160° C., pouring the melt into a metal tray and allowing it to stand and cool for 18 hours. The cooled and hardened crystalline product was crushed and sieved through a 20 mesh screen. Further size classification produced granulates in the 30 to 40 mesh range. A five-week, moisture pick-up comparative study of the 1a processed isomalt and unprocessed isomalt showed no loss of stability due to processing.

1b: An isomalt granulate was similarly prepared as in 1a using powdered isomalt. The isomalt was slowly heated to 160° C. with melting, poured into metal trays, cooled, and sieved as in 1a.

Comparative Examples C1–C4

Preparation of Polyol Granulates

C1: A 70:30 mixture of xylitol and water was heated to 160° C. and cooled as in Example 1a. Granulates were prepared as in Example 1a.

C2: Preparation of maltitol granulates from 10%, 5%, and 2.5% aqueous maltitol solutions was attempted, using the procedure of Example 1a. In all cases, crystal preparation proved difficult. Crystalline granulate having a mesh size of 20 to 30 was finally prepared by heating 2.5% aqueous maltitol to 180° C. followed by cooling for 24 hours.

C3, C4: Samples of sorbitol and mannitol were similarly mixed with water, heated to 160° C. and cooled both independently and in admixture. No recrystallization was observed upon cooling and therefore no granulate having an acceptable particle size could be prepared.

EXAMPLES 2, 3, C5 AND C6

Chewing Gum Preparation

A series of chewing gum samples were prepared by conventional methods employing the following gum formulation:

| Formula I: Chewing Gum | |
|---|---|
| Ingredients | Percentage % |
| Gum Base | 26.0 |
| Softeners | 6.5 |
| Flavor(s) | 1.5 |
| Intense Sweeteners | 0.52 |
| Polyalcohols* | 65.48 |

*Total Polyalcohol includes weight of granulated material.

The sugarless crunch was added with the intense sweeteners to the gum mixture containing partially mixed gum ingredients. The gum was mixed until completion of the full mixing cycle, removed from the gum kettle and rolled and scored in the conventional manner. The gum samples were formulated using the granulates prepared in the prior examples as follows:

TABLE 1

| Gum Example | Granulate Example | % Granulate |
|---|---|---|
| 2 | 1a | 10 |
| 3 | 1b | 16 |
| C5 | C1 | 10 |
| C6 | C2 | 16 |

No formulations were prepared from sorbitol or mannitol (Example C3 and C4) since granulates could not be prepared from these polyols or their mixtures.

Comparative Tests

Chew studies of the granulate-containing gums were conducted by a panel of four experts in the gum arts. The studies were two-fold: (1) duration of crunch studied over time and (2) organoleptic effects. The samples were stored at 37° C. in a stability oven to provide an accelerated aging process over the 12 week study period. Chews were made at various intervals. Crunch results were measured by noting the time over which the crunch was maintained. Organoleptic evaluation was done on sensory impressions.

Table 2 shows the comparative chew test results initially and after extended storage, the chew tests being taken at two-week intervals. The numbers indicate duration in minutes and seconds.

TABLE 2

| Example | Initial | Week 2 | Week 4 | Week 6 | Week 8 | Week 12 |
|---|---|---|---|---|---|---|
| 2 | 2:30 | 2:20 | 1:55 | 1:35 | 1:00 | 0:45 |
| 3 | 1:51 | 1:51 | 1:51 | 1:51 | 1:20 | 1:00 |
| C5 | 1:30 | 1:30 | 1:30 | 1:30 | 0:50 | 0:40 |

Example C6, the gum containing the maltitol granulates, is not included in the table. C6 was evaluated as having good initial crunch but the granulates proved unstable within a gum formulation, the granulates having plasticized within one week of the test period.

Table 2 indicates that both xylitol (Example C5) and isomalt (Example 2) can provide crunch duration. With xylitol, however, the initial chew time before crunch disappears is lower than with isomalt. The Example 3 gum containing 16% amount of the isomalt crunch additive exhibited slightly less initial crunch duration as compared to the gum of Example 2, but provided extended stability of the crunch duration.

The gum products of Examples 2, 3 and C5 were concomitantly evaluated for organoleptic impressions (sensory impressions) during the crunch duration tests. The expert panel found that the Example 2 gum provided a crunch which was very similar to that of granulated sugar, firm and slightly gritty in nature, the desired texture and effect necessary for a "crunch" gum. The crunch remained consistent for 2+ minutes and gradually diminished during a 5 minute chew. Example 3 was evaluated as similar to Example 2 in effect. The crunch of the Example C5 gum was evaluated as softer by comparison. The granulates were found to have a tendency to melt in the mouth during chew, rather than crunch or pop, upon chewing. The panel concluded that while C5 provided a stable gum product it did not meet the necessary criteria (organoleptic requirements) for crunch in the gum's chew texture.

Having now fully described the invention, it will be apparent to one of ordinary skill in the art that many changes and modifications can be made thereto without departing from the spirit or scope of the invention as set forth herein.

What is claimed is:

1. A chewing gum comprising: (a) one or more elastomers, sweeteners and flavorants, and (b) a granulated isomalt additive having a particle size greater than about 50 mesh incorporated internally within said gum, in an amount such that said additive provides a crunch to said gum during chewing thereof.

2. The gum of claim 1 wherein said gum is a sugarless gum.

3. The gum of claim 1 wherein said additive is prepared by heating isomalt at a temperature of 130° C. or higher, cooling to form a solid isomalt product, and granulating said solid isomalt product to a particle size greater than 50 mesh.

4. The gum of claim 3 wherein said additive is prepared by dissolving isomalt in water to form a solution and heating said solution to a temperature in excess of 130° C. prior to cooling.

5. The gum of claim 3 wherein said isomalt is heated to a temperature of above 145° C.

6. The gum of claim 5 wherein said isomalt is heated to a temperature of above 160° C.

7. The gum of claim 1 wherein said isomalt contains one or more flavoring agents.

8. The gum of claim 1 wherein said isomalt contains one or more dyes or colorants.

9. The gum of claim 1 wherein said granulated additive has a particle size greater than 40 mesh.

10. The gum of claim 9 wherein said granulated additive has a particle size range of 30 mesh to 40 mesh.

11. The gum of claim 1 wherein said amount of said additive is from about 9% to about 16% by weight of said gum.

12. The gum of claim 11 wherein said amount is from 10% to 15% by weight.

13. A process for the preparation of a chewing gum product, said process comprising:
    a) preparing a granulated isomalt additive by granulating solid isomalt to a particle size greater than 50 mesh, and,
    b) blending said additive with a chewing gum composition so that said additive is incorporated internally within said chewing gum product in an amount effective to provide a crunch to said chewing gum product during chewing thereof.

14. The process of claim 13 which further comprises heating isomalt at a temperature of 130° C. or higher and cooling to form said solid isomalt.

15. The process of claim 14, which further comprises dissolving isomalt in water to form a solution and heating said solution to above 130° C. prior to cooling.

16. The process of claim 14 wherein said isomalt is heated to a temperature of above 145° C.

17. The process of claim 16 wherein said temperature is above 160° C.

18. The process of claim 13 wherein said additive contains one or more adjuvants selected from flavorants and colorants.

19. The process of claim 13 which further comprises screening said granulate to a particle size less than 40 mesh prior to said blending step.

20. The process of claim 19 wherein said granulate is screened to a particle size between about 30 mesh and 40 mesh.

21. The process of claim 13 wherein said amount of said additive is from about 9% to about 16% by weight of said gum.

22. The process of claim 21 wherein said amount of said additive is from 10% to 15% by weight.

* * * * *